Sept. 13, 1927.                  G. A. JONES                   1,642,151
                                MOUSE TRAP
                              Filed Dec. 8, 1925
Fig.1.                                    Fig.2.
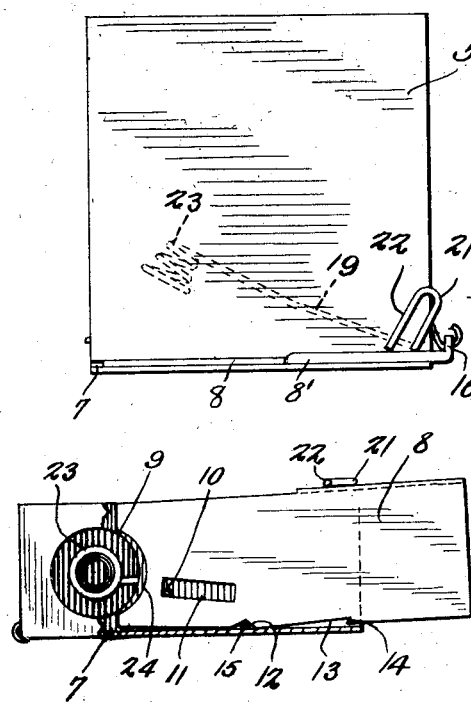
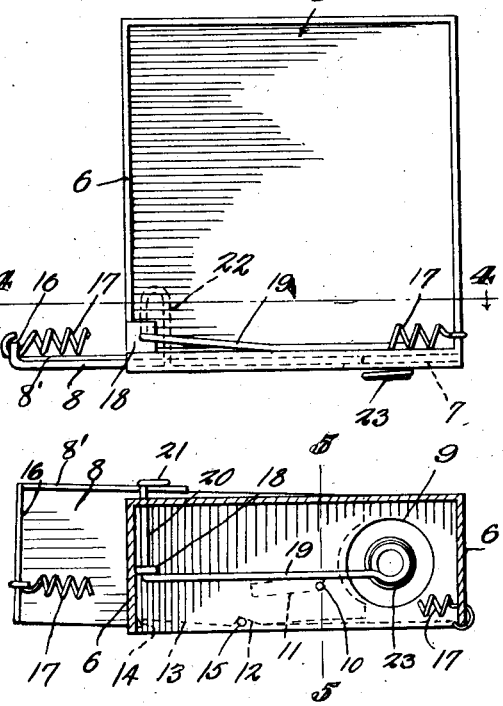
Fig.3.                                    Fig.4.
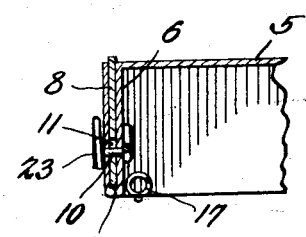
Fig.5.
G. A. Jones
Inventor
By C.A.Snow & Co.
Attorneys.

Patented Sept. 13, 1927.

1,642,151

UNITED STATES PATENT OFFICE.

GEORGE AUGUSTUS JONES, OF DENVER, COLORADO.

MOUSE TRAP.

Application filed December 8, 1925. Serial No. 74,061.

This invention relates to animal traps, and more particularly to a trap designed to catch mice, an object of the invention being to provide a trap including a body portion having an opening at one side thereof and being so constructed that the same may be readily and easily set, or emptied when the mouse has been caught therein.

An important object of the invention is to provide a trap wherein the setting of the trap may be accomplished exteriorly of the trap and remote from the jaw thereof, eliminating any possibility of the person setting the trap, catching his fingers in the jaw of the trap.

Another object of the invention is to provide a sanitary trap which may be either set or emptied, it being unnecessary for the person to touch that part of the trap contacted by the mouse.

A still further object of the invention is to provide a trap which will be positive in its operation, and one which will only operate by the action of the trigger releasing the movable jaw portion as the mouse attempts to secure the bait, thereby eliminating any possibility of the trap being set off while placing the trap in position when set.

Another object of the invention is to provide a trap wherein the mouse may only obtain a portion of the bait positioned on the trigger portion of the trap, to the end that a single bait may serve to catch several mice.

A still further object of the invention is to provide a trap which is exceptionally simple in construction and one that is durable in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of the invention, showing the same as in its unset position.

Figure 2 is a bottom view illustrating the trap in a set position.

Figure 3 is an end view of the trap, a portion of one wall thereof being broken away.

Figure 4 is a sectional view taken on line 4—4 of Figure 2.

Figure 5 is a sectional view taken on line 5—5 of Figure 4.

Referring to the drawing in detail, the device includes a rectangular body portion 5 which is provided with flanges 6, forming the side walls of the body portion, the bottom of the trap being open as clearly shown by Figure 2 of the drawing.

One wall of the body portion is folded upon itself to provide a guideway 7 in which the movable jaw 8 operates, the movable jaw 8 being of a width equal to the width of the wall in which the guideway is formed. As illustrated by Figure 3 of the drawing, the wall in which the passageway is formed is provided with a circular cut out portion 9, which opening is of a diameter to permit a mouse to pass his head therethrough in an endeavor to obtain bait supported in the body portion, and in a manner to be hereinafter more fully described.

Extending across the guideway is a pin 10 that moves in the elongated inclined opening 11 to restrict movement of the jaw with respect to the guideway, it being understood that one edge of the guideway 7 is left open.

The pin 10 serves as the pivot point about which the jaw 8 may rotate until checked by contact between the lower and forward point of that jaw and the passageway 7. As the jaw moves forward to intersect the opening 9, the distance between said lower forward point of the jaw and the pin 10 increases and correspondingly reduces the arc through which the jaw 8 may rotate edgewise about the pin 10. This progressive limitation of said rotary movement serves to wedge the notched edge of the jaw 8 into closer contact with the guideway 7 and produce a clamping action as the jaw 8 moves to intersect the opening 11.

One edge of the jaw is provided with the flange 8' the opposite edge of the movable jaw 8 being formed with notched portions 12 and 13 respectively, the edges of the notch portion 12 being inclined as illustrated by Figure 3, while the end edge of the notch 13 defines a shoulder 14, which notches cooperate with the pin 15 to control the movements of the jaw 8, the shoulder 14 however, acting as a stop to engage the pin 15 to limit the movement of the jaw 8 longitudinally as well as laterally of the guideway. Thus it will be seen that the jaw must move upwardly when it is to be operated, so that the edges of the notch 12 will clear the pin 15.

One end of the jaw is bent at right angles as at 16 where it is provided with an opening for the reception of one end of the coiled spring 17, the opposite end thereof being positioned in an opening formed in one wall of the body portion of the trap as shown by Figure 2. The spring 17 is preferably inclined at an angle to the bottom of the trap as shown in Fig. 4, so that its tension may more easily draw the notch 12 obliquely or laterally across and out of engagement with the pin 15. The line of tension of said spring is, however, so nearly parallel to the guideway 7 that the major portion of the coil spring tension, when the trap is in set position, is received or absorbed by the pin 15 rather than by the latch arm 22.

At a point adjacent to one corner of the trap is a flange 18 which is provided with an opening for the reception of a trigger which embodies an arm 19 provided with a right angled portion 20 and a latch extremity 21 that includes an arm 22, which arm 22 is adapted to normally overlie flange 8' of the jaw 8 as shown by Figure 3, to normally hold the jaw downwardly so that the edge of the notch 12 will be held into engagement with pin 15 and restrict movement of the jaw, or to normally hold the jaw in its set position.

Formed at the opposite end of the arm 19 is a coiled portion 23 that tapers inwardly and acts as a bait pan or holder for the bait, and as shown, the coiled portion is adapted either to extend through the opening 9 and exteriorly of the trap, or normally be within the trap proper, to tempt mice, the length of the arm 22 being such that the arm 19 will move inwardly a considerable distance before the arm 22 disengages the jaw 8 to allow the spring 17 to contract and draw the jaw through the guideway to accomplish its purpose.

The bait pan or holder is so constructed that when the bait is forced thereinto, due to the tapered construction thereof, the bait will be restricted in its passage into the bait holder, with the result that portions of the bait will be forced laterally between the coils to lock the bait within the holder against ready removal.

It might be further stated that the jaw is provided with a curved portion 24 conforming to the curvature of the opening 9 so that every portion of the animal's neck will be engaged by the jaw and cooperating wall of the opening 9 in catching the mouse.

From the foregoing detail description it is believed that the operation of the device will be clearly understood, however it might be stated that in setting the device, the jaw 8 is moved to a position as shown by Figure 3 and the bait placed in the bait holder 23, thereupon the bait holder is moved to a position as shown by Figure 2, bringing the arm 22 over the upper edge of the jaw 8 to hold the same downwardly and into engagement with the pin 15.

I claim:

1. In an animal trap, a body portion having an opening, a jaw adapted to intersect said opening, means to actuate said jaw, fixed means to check the longitudinal movement of said jaw until said jaw has moved laterally, movable means to check said lateral movement, and means to release said movable means to permit the movement of said jaw.

2. In an animal trap, a body portion having an opening, a jaw adapted to intersect said opening, tensioning means to actuate said jaw, fixed means adapted to divert the movement of said jaw at an angle to the direction of normal tension, a movable stop adapted, when the trap is set, to check said angular movement of said jaw, and means adapted to be actuated by an animal to release said movable means to permit the angular movement of said jaw.

3. In an animal trap, a body portion having an opening, a jaw adapted to intersect said jaw, fixed means adapted to divert the move said jaw in one direction, and checking means positioned outside the path of said normal movement, adapted to restrain the movement of said jaw while the trap is set, and to permit said movement when said checking means is actuated by an animal.

4. In an animal trap, a body portion having an opening, a jaw adapted to intersect said opening, a guideway for said jaw having means to prevent the lateral movement of said jaw in one direction, a movable stop adapted to prevent lateral movement of said jaw in a second direction when the trap is set, and to permit said movement when the trap is sprung, and means adapted to limit said lateral movement.

5. In an animal trap, a body portion having an opening, a jaw adapted to intersect said opening, a guideway for said jaw, cooperating stops in said jaw and in said guideway adapted to prevent the movement of said jaw in the direction of greatest tension, but to permit its movement at an angle to said direction, and a second stop adapted to engage said jaw to prevent said angular movement when the trap is set, and means to release said second stop from said jaw adapted to be actuated by an animal.

6. In an animal trap, a body portion having an opening, a jaw adapted to intersect said opening, tensioning means to actuate said jaw, a fixed stop to check the movement of said jaw in the direction of said tension, and a second stop adapted to hold said jaw in engagement with said fixed stop while the trap is set, and to release said jaw when actuated by an animal.

7. In an animal trap in combination seizing means, a holder for bait acecssible to an animal and adapted to retreat under pressure for the purpose of luring said animal into range of said seizing means, and means connected with said bait holder to hold said trap in set position during a substantial portion of said retreating movement, and to spring said trap upon further movement of said bait holder.

8. In an animal trap, a body portion having an opening, a jaw adapted to intersect said opening, a stop adapted to check the movement of said jaw, and means adapted to cause the lateral movement of said jaw to disengage said jaw from said stop.

9. In an animal trap, a body portion having an opening, a jaw adapted to intersect said opening, a stop adapted to check the movement of said jaw, means adapted to cause the lateral movement of said jaw to disengage said jaw from said stop, and means to limit said lateral movement.

10. In an animal trap, a body portion having an opening, a jaw adapted to intersect said opening, a stop adapted to check the movement of said jaw, means adapted to cause the lateral movement of said jaw to disengage said jaw from said stop, and means to limit said lateral movement more narrowly as the jaw moves toward said opening.

11. In an animal trap, a body portion having an opening, a jaw adapted to intersect said opening, means adapted to hold said jaw in set position until the trap is sprung, said means including a latch actuated by a trigger and said jaw having a flange adapted to provide a smooth bearing surface for said latch.

12. In a device of the character described, a body portion, one wall of the body portion having a cut out portion and folded upon itself to provide a passageway, a slidable upright jaw positioned within the passageway, said sliding jaw adapted to cooperate with one wall of the cut out portion to set up a clamping action therewith, a trigger for normally holding the sliding jaw in set position, and a coiled spring connected with the sliding jaw for moving the jaw to its active position.

13. In an animal trap of the character described, a body portion having a circular opening formed in one wall thereof, said body portion having an open lower portion, a sliding jaw having a curved end cooperating with one wall of the opening to clamp an animal therebetween, a pivotally mounted trigger adapted to hold the jaw portion normally in its set position, and said trigger adapted to release said sliding jaw to permit the spring to move the jaw to its active position.

14. In an animal trap of the class described, a body portion having one wall folded to provide a guideway, said wall having an opening disposed adjacent to one end of the guideway, a sliding jaw adapted to move freely through the guideway, a coiled spring for moving the jaw within the guideway, means adapted to absorb the major portion of the coiled spring tension when the trap is in a set position, a trigger adapted to support bait, and said trigger adapted to release the jaw when a mouse attempts to move bait therefrom.

15. An animal trap comprising in combination, a body portion, one wall of the body portion having a passageway, a circular opening in the end of said passageway, a slidable jaw portion movable through the passageway, said passageway having a guide to guide the jaw in its course of travel, and said guide adapted to set up a wedging action between the passageway and said jaw.

16. An animal trap comprising in combination, a body portion having a passageway, and having an opening adjacent to one end of the passageway, a sliding jaw, a coiled spring connected with the jaw and body portion to move the jaw into clamping relation with the wall of the opening, a retreating bait pan trigger, said retreating bait pan trigger adapted to normally lie within the confines of the opening, and a portion thereof extending beyond the opening, and said trigger adapted to release the jaw.

17. In an animal trap, in combination, a casing having an opening, means within said opening adapted to seize an animal, a movable bait holder extending outside said casing when the trap is in set position and adapted to actuate said seizing means when said bait holder is moved back within said casing.

18. In an animal trap, in combination, a casing having an opening, a bait holder adapted to extend outside said casing and to retreat within said casing when pressed by an animal and means operatively connected with said bait holder to hold said trap in set position while said bait holder is outside said casing, and to spring said trap when said bait holder has retreated substantially within said casing.

19. In an animal trap, in combination, means for seizing an animal, a bait holder adapted for movement in the direction of said seizing means, means to hold said trap in set position during a substantial portion of said movement, and means to spring said trap upon further movement of said bait holder.

In testimony that I claim the foregoing as my own, I have hereto affixed my signature.

GEORGE AUGUSTUS JONES.

Certificate of Correction.

Patent No. 1,642,151. Granted September 13, 1927, to

GEORGE AUGUSTUS JONES.

It is hereby certified that error appears in the printed specification of the above-numbered patent requiring correction as follows: Page 2, line 109, claim 3, strike out the words " jaw, fixed means adapted to divert the " and insert instead *opening, means tending normally to;* and that the said Letters Patent should be read with this correction therein that the same may conform to the record of the case in the Patent Office.

Signed and sealed this 1st day of November, A. D. 1927.

[SEAL.]
M. J. MOORE,
*Acting Commissioner of Patents.*